(12) United States Patent
Kim et al.

(10) Patent No.: US 9,538,248 B2
(45) Date of Patent: Jan. 3, 2017

(54) METHOD FOR SHARING BROADCAST CHANNEL INFORMATION AND ELECTRONIC DEVICE THEREOF

(71) Applicant: Samsung Electronics Co., Ltd., Suwon-si, Gyeonggi-do (KR)

(72) Inventors: Jang-Seong Kim, Yongin-si (KR); Sung-Taek Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/547,755

(22) Filed: Nov. 19, 2014

(65) Prior Publication Data

US 2015/0143402 A1  May 21, 2015

(30) Foreign Application Priority Data

Nov. 19, 2013  (KR) ........................ 10-2013-0140496

(51) Int. Cl.
| | | |
|---|---|---|
| *G06F 3/00* | (2006.01) | |
| *G06F 13/00* | (2006.01) | |
| *H04N 5/445* | (2011.01) | |
| *H04N 7/173* | (2011.01) | |
| *H04N 21/478* | (2011.01) | |
| *H04N 21/41* | (2011.01) | |
| *H04N 21/414* | (2011.01) | |
| *H04N 21/436* | (2011.01) | |
| *H04N 7/16* | (2011.01) | |
| *H04N 21/462* | (2011.01) | |

(Continued)

(52) U.S. Cl.
CPC ............ *H04N 21/478* (2013.01); *G06Q 30/00* (2013.01); *H04N 7/163* (2013.01); *H04N 7/17336* (2013.01); *H04N 21/4126* (2013.01); *H04N 21/41407* (2013.01); *H04N 21/43615* (2013.01); *H04N 21/44204* (2013.01); *H04N 21/4622* (2013.01)

(58) Field of Classification Search
None
See application file for complete search history.

(56) References Cited

U.S. PATENT DOCUMENTS

2005/0251827 A1* 11/2005 Ellis ................... H04N 5/44543
725/47
2006/0101504 A1* 5/2006 Aravamudan ..... H04N 5/44543
725/136

(Continued)

*Primary Examiner* — Nathan Flynn
*Assistant Examiner* — William J Kim
(74) *Attorney, Agent, or Firm* — Jefferson IP Law, LLP

(57) ABSTRACT

A broadcast channel information sharing method in an electronic device and the electronic device thereof are provided. An operation method in an electronic device includes creating a request message of requesting to share broadcast channel information, the request message comprising one or more of user information, location information, and habit information, transmitting, by the electronic device, the request message to a network server, receiving, by the electronic device, a response message corresponding to the request message from the network server, and extracting, by the electronic device, broadcast channel information of another electronic device comprised in the response message and sharing the extracted broadcast channel information with the other electronic device.

20 Claims, 17 Drawing Sheets

(51) Int. Cl.
*G06Q 30/00* (2012.01)
*H04N 21/442* (2011.01)

(56) References Cited

U.S. PATENT DOCUMENTS

| | | | |
|---|---|---|---|
| 2007/0157242 A1* | 7/2007 | Cordray | H04H 60/33 |
| | | | 725/46 |
| 2008/0270449 A1* | 10/2008 | Gossweiler | G06F 17/30817 |
| 2009/0133071 A1* | 5/2009 | Sakai | H04N 5/4403 |
| | | | 725/46 |
| 2009/0144786 A1* | 6/2009 | Branam | H04N 5/44543 |
| | | | 725/109 |
| 2010/0011020 A1 | 1/2010 | Bouzid et al. | |
| 2012/0084804 A1* | 4/2012 | Simmons | H04N 21/25816 |
| | | | 725/28 |
| 2012/0144427 A1* | 6/2012 | Lee | H04N 21/472 |
| | | | 725/51 |
| 2013/0166698 A1 | 6/2013 | Georgis et al. | |

\* cited by examiner

Channel Information Database

\* User Info

| User ID | User Name | AuthInfo |
|---|---|---|
| U0000001 | Alex | F055695AD4CD47A02268EECEF5A60CD24ECDCACC8EB8365796F85AD |
| U0000002 | Jane | F024765AB6E7356D4PO108C153879CDE5761FP81CUA71TXP54ASE90C |
| : | : | : |

\* User Location

| User ID | CountryCode | ZipCode | Channel Set ID |
|---|---|---|---|
| U0000001 | UK | SW1P 3PA | CS0001 |
| U0000002 | US | 90041 | CS0002 |
| : | : | : | : |

\* Channel Set

| Channel Set ID | Provider ID | Provider N | Channel ID | Channel Info | Channel No | Channel Name | IsPrefered |
|---|---|---|---|---|---|---|---|
| U0000001 | P00123 | BBC | C0094 | (9A, 63, 0E) | 14 | BBC News | Y |
| U0000001 | P00123 | BBC | C0095 | (9A, 63, 8E) | 30 | BBC Sports | N |
| U0000002 | P00191 | FOX | C1052 | (1E, 28, A3) | 2 | FOX Drama | Y |
| : | : | : | : | : | : | : | : |

FIG.6

\* User Habit

| User ID | Activity Type | isVOD | Provider ID | Channel ID | Title | Genre | OnAir TimeStart | OnAir TimeEnd | Activity Time | IsPayed | IsPrefered | IsSearched |
|---|---|---|---|---|---|---|---|---|---|---|---|---|
| U0000001 | Watch | N | P00123 | C0094 | News 9 | News | pm.7 | pm.9 | 30 minute | N | Y | Y |
| U0000001 | Watch | N | P00123 | C0095 | NBA Today | Sports Basketball | pm.8 | pm.9 | 10 minute | N | Y | Y |
| U0000001 | Watch | N | P00123 | C0095 | Premire League | Sports Football | pm.1 | pm.3 | 20 minute | N | Y | Y |
| U0000001 | Watch | N | P00191 | C1052 | BigBang Season 1 | Drama | pm.2 | pm.3 | 50 minute | N | Y | Y |
| U0000002 | Watch | N | P00191 | C1060 | Modern Family Season 2 | Drama | pm.6 | pm.7 | 40 minute | N | N | Y |
| .. | .. | .. | .. | .. | .. | .. | .. | .. | .. | .. | .. | .. |

FIG.7

| Request Description | |
|---|---|
| Field Name | Description |
| URI | /epg/requestEPGRecommendation |
| Method | POST |
| Parameters | |

| | | |
|---|---|---|
| Mandatory | user_token | OAUTH-BASED USER AUTHENTICATION AND WEB RESOURCE ACCESS AUTHORITY |
| Mandatory | countryCode | USER'S COUNTRY CODE |
| Mandatory | zipCode | ZIP CODE USED TO RECOMMEND USER'S CHANNEL INFORMATION (IN CASE OF USER LOCATED IN SAME AREA, IT USES CHARACTERISTIC HAVING SIMILAR CHANNEL INFORMATION) |
| Optional | stv | LOCAL TERRESTRIAL BROADCASTING OPERATOR ID |

Request sample

URI:
http://api.yosemite.com/mobile/epg/requestEPGRecommendation

HEADER:
accept: application/json

BODY:
{
    "user_token" : "F055695AD4CD47A02268EE31106AA9AEB53750244D13067CEF5A60CD24ECDCACC8EB8365796F85AD",
    "countryCode" : "UK",
    "zipcode": "SW1P 3PA"
}

FIG.8

| Request Description | | |
|---|---|---|
| Field Name | | Description |
| Command | | requestEPG |
| Method | | Use Samsung Push Platform |
| Parameters | | |
| Mandatory | user_token | OAUTH-BASED USER AUTHENTICATION AND WEB RESOURCE ACCESS AUTHORITY |
| Mandatory | countryCode | USER'S COUNTRY CODE |
| Mandatory | zipCode | ZIP CODE USED TO RECOMMEND USER'S CHANNEL INFORMATION (IN CASE OF USER LOCATED IN SAME AREA, IT USES CHARACTERISTIC HAVING SIMILAR CHANNEL INFORMATION) |
| Mandatory | SVR_authToken | SERVER AUTHENTENTICATION TOKEN (IT IS USED TO CHECK A SERVER BY AN AGENT INSTALLED IN A TERMINAL) |
| Optional | stv | LOCAL TERRESTRIAL BROADCASTING OPERATOR ID |

Request sample

```
{
"user_token" :
"F055695AD4CD47A02268EE31106AA9AEB53750244D13067CEF5A60CD24ECDCACC8EB8365796F85AD",
"countryCode" : "UK",
"zipcode" : "SW1P 3PA",
"SVR_authToken": "F024765AB6E7356D4PO108C153879CD37Q06K5GE5761FP81CUA71TXP54ASE90C"
"stv" : "ITV"
}
```

FIG.9

| Response Description | | | |
|---|---|---|---|
| Parameters | | | Description |
| Mandatory | channelCount | | CHANNEL COUNT |
| Mandatory | channelList | providerID | CHANNEL PROVIDER ID |
| | | providerName | CHANNEL PROVIDER |
| | | channelInfo | CHANNEL INFORMATION INCLUDING DVB TRIPLET |
| | | id | CHANNEL ID |
| | | name | CHANNEL NAME |
| | | isPrefered | PREFER CHANNEL OR NOT (Y/N) |
| Optional | comment | | ADDITIONAL INFORMATION OTHER THAN CHANNEL INFORMATION |

Request sample

```
{
   "channelCount" : "1"
   "channelList" : [
    {
       "providerID" : "123",
       "providerName" : "BBC",
       "channelInfo" : "(A, B, C)"
       "id" : "2",
       "name": "BBC News"
       "isPrefered": "Y"
    }
   ]
}
```

FIG.10

| Response Description | | | |
|---|---|---|---|
| | Parameters | | Description |
| Mandatory | channelCount | | CHANNEL COUNT |
| Mandatory | channelList | providerID | CHANNEL PROVIDER ID |
| | | providerName | CHANNEL PROVIDER |
| | | channelInfo | CHANNEL INFORMATION INCLUDING DVB TRIPLET |
| | | id | CHANNEL ID |
| | | name | CHANNEL NAME |
| | | isPrefered | PREFER CHANNEL OR NOT (Y/N) |
| Mandatory | countHabitInfo | | USE HABIT INFORMATION |
| Mandatory | habitInfoList | isPrefered | BEHABIOR PATTERN (IMPRESSION OR NOT / PREFER OR NOT / PAY HISTORY / SEARCH HISTORY) |
| Mandatory | | isVOD | VOD OR EPG BROADCASTING (Y OR N) |
| Mandatory | | contentProvider | CONTENT PROVIDER OR CHANNEL PROVIDER |
| Mandatory | | title | CONTENT NAME |
| Optional | | channelId | WATCHING CHANNEL INFORMATION |
| Optional | | onAirTimeStart | ON AIR TIME START |
| Optional | | onAirTimeEnd | ON AIR TIME END |
| Optional | | watchingTime | WATCHING TIME |
| Optional | | isPayed | PAY OR NOT |
| Optional | | isPrefered | PREFER OR NOT |
| Optional | | isSearched | SEARCH OR NOT |
| Optional | channelCount | | ADDITIONAL INFORMATION OTHER THAN CHANNEL INFORMATION |

FIG.16

```
Response sample
{
   "channelCount" : "1"
   "channelList" : [
   {
      "providerID" : "123",
      "providerName" : "BBC",
      "channelInfo" : "(A, B, C)",
      "id" : "2",
      "channelName": "BBC News",
      "onAirTitle" : "Prime News",
      "onAirTimeStart" : "pm. 7",
      "onAirTimeEnd" : "pm. 9",
      "isPrefered": "Y"
   }
   ]
   "countHabitInfo" : "1"
   "habitInfoList" : [
   {
      "activityType" : "watch",
      "isVOD" : "N",
      "contentProvider" : "BBC",
      "title" : "BBC News",
      "channelId" : "2",
      "onAirTimeStart" : "pm. 7",
      "onAirTimeEnd" : "pm. 9",
      "watchingTime" : "30 minutes"
      "isPayed" : "N",
      "isPrefered" : "Y",
      "isSearched" : "Y"
   }
   ]
}
```

FIG.17

METHOD FOR SHARING BROADCAST CHANNEL INFORMATION AND ELECTRONIC DEVICE THEREOF

CROSS-REFERENCE TO RELATED APPLICATION(S)

This application claims the benefit under 35 U.S.C. §119(a) of a Korean patent application filed on Nov. 19, 2013 in the Korean Intellectual Property Office and assigned Serial number 10-2013-0140496, the entire disclosure of which is hereby incorporated by reference.

TECHNICAL FIELD

The present disclosure relates to a method for sharing broadcast channel information and the electronic device thereof.

BACKGROUND

Digital broadcasting can be divided into terrestrial broadcasting providing multi-channel broadcasting, cable broadcasting, satellite broadcasting, and the like. A digital broadcasting operator provides electronic program guide information as additional information about a digital broadcasting program. The electronic program guide information can be abbreviated as Electronic Program Guide (EPG) information. The EPG information is provided through a vacant frequency band of the digital broadcasting, an additional channel, or the like. The EPG information can include various broadcasting information such as a broadcasting program, a broadcast channel, a broadcasting time, broadcasting content, cast member information, and the like.

A digital broadcasting receiver of various types such as a Digital TeleVision (D-TV), a set-top box, an Internet Protocol-TV (IP-TV), and the like receives the EPG information and stores the EPG information in a non-volatile memory. Thereafter, the EPG information is provided to a user through a user interface. The user can handle a remote controller to search or select any broadcasting program and the like displayed within an EPG screen and simply and conveniently perform watching, scheduled recording, or the like.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a broadcast channel information sharing method of an electronic device and the electronic device thereof, in which an electronic device of various types such as a smart phone, a tablet Personal Computer (PC) or the like can communicate with a cloud computing based network server, and receive and share broadcast channel information of another electronic device associated with any one or more of user information, location information, and habit information.

In accordance with an aspect of the present disclosure, an operation method of an electronic device is provided. The operation method includes the processes of creating a request message of requesting to share broadcast channel information, the request message comprising any one or more of user information, location information, and habit information, transmitting, by the electronic device, the request message to a network server, receiving, by the electronic device, a response message corresponding to the request message from the network server, and extracting, by the electronic device, broadcast channel information of another electronic device comprised in the response message and sharing the extracted broadcast channel information with the other electronic device.

In accordance with another aspect of the present disclosure, an electronic device is provided. The electronic device includes a communication module configured to communicate with a network server, and a processor configured to control the communication module. The processor is further configured to create a request message of requesting to share broadcast channel information, the request message comprising any one or more of user information, location information, and habit information, transmit the request message to the network server, receive a response message corresponding to the request message from the network server, and extract broadcast channel information of another electronic device comprised in the response message and share the extracted broadcast channel information with the other electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a diagram illustrating a configuration of a channel information database according to various embodiments of the present disclosure;

FIG. 7 is a diagram illustrating user habit information stored in a channel information database according to various embodiments of the present disclosure;

FIG. 8 is a diagram illustrating a configuration of a request message according to various embodiments of the present disclosure;

FIG. 9 is a diagram illustrating a configuration of a request message according to various embodiments of the present disclosure;

FIG. 10 is a diagram illustrating a configuration of a response message according to various embodiments of the present disclosure;

FIG. 16 is a diagram illustrating a description of broadcast channel information and habit information according to various embodiments of the present disclosure; and FIG. 17 is a diagram illustrating a configuration of a response message according to various embodiments of the present disclosure.

Throughout the drawings, it should be noted that like reference numbers are used to depict the same or similar elements, features, and structures.

DETAILED DESCRIPTION

Figure 1:
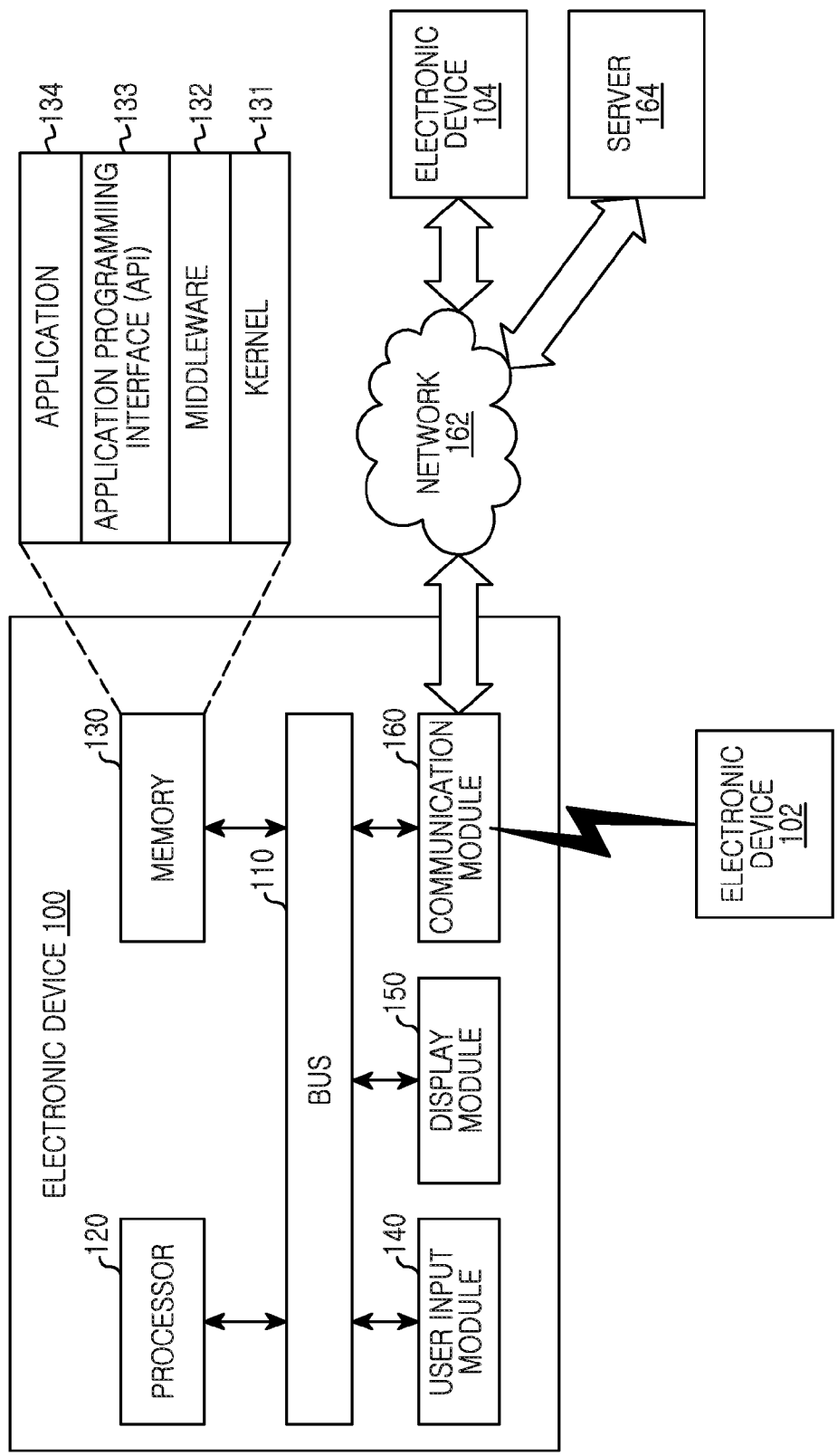
FIG. 1 is a block diagram illustrating a configuration of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the present disclosure can be a device including a telecommunication function. For example, the electronic device can be one or a combination of more of various electronic devices such as a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MPEG Audio Layer 3 (MP3) player, a mobile medical instrument, an electronic bracelet, an electronic necklace, an appcessory, a camera, a wearable device, an electronic clock, a wrist watch, a smart home appliance (e.g., a refrigerator, an air conditioner, a cleaner, an artificial intelligence robot, a TV, a Digital Video Disk (DVD) player, an audio system, an oven, a microwave, a washing machine, an air cleaner, an electronic frame, and the like), various medical instruments (e.g., Magnetic Resonance Angiography (MRA), Magnetic Resonance Imaging (MRI), Computerized Tomography (CT), a scanning machine, an ultrasound machine, and the like), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a car infotainment device, electronic equipment for ships (e.g., a navigation device for ship, a gyrocompass, and the like), avionics, a security instrument, electronic clothes, an electronic locking system, a camcorder, a game console, a Head-Mounted Display (HMD), a flat panel display device, an electronic album, a part of furniture or building/structure including the telecommunication function, an electronic board, an electronic signature receiving device, a projector, and the like. It is apparent to those skilled in the art that the electronic device according to the various embodiments of the present disclosure is not limited to the aforementioned instruments.

FIG. 1 is a block diagram illustrating a configuration of an electronic device according to various embodiments of the present disclosure.

Referring to FIG. 1, the electronic device 100 can include a bus 110, a processor 120, a memory 130, a user input module 140, a display module 150, and a communication module 160. The bus 110 can be a circuit connecting the aforementioned constituent elements with one another, and forwarding communication (e.g., control message) among the aforementioned constituent elements. The processor 120 can, for example, receive instructions from the aforementioned other constituent elements (e.g., the memory 130, the user input module 140, the display module 150, the communication module 160, and the like) through the bus 110, decipher the received instructions, and execute operation or data processing according to the deciphered instructions.

The memory 130 can store an instruction or data which is received from the processor 120 or the other constituent elements (e.g., the user input module 140, the display module 150, the communication module 160, and the like) or is created by the processor 120 or the other constituent elements. The memory 130 can include, for example, programming modules such as a kernel 131, a middleware 132, an Application Programming Interface (API) 133, an application 134, and the like. The aforementioned respective programming modules can be comprised of software, firmware, hardware or a combination of at least two or more of software, firmware, and hardware.

The kernel 131 can control or manage system resources (e.g., the bus 110, the processor 120, the memory 130, and the like) used for executing operations or functions implemented in the other programming modules, for example, the middleware 132, the API 133, and the application 134. The kernel 131 can provide an interface capable of accessing and controlling or managing the individual constituent element of the electronic device 100 in the middleware 132, the API 133, or the application 134.

The middleware 132 can perform a relay role such that the API 133 or the application 134 can communicate and exchange data with the kernel 131. In addition, in relation with work requests received from the (plurality of) applications 134, the middleware 132 can, for example, perform load balancing for the work request by a method of allotting at least one application among the (plurality of) application 134 the order of priority for using the system resources (e.g., the bus 110, the processor 120, the memory 130, or the like) of the electronic device 100, and the like.

The API 133 is an interface of enabling the application 134 to control a function provided by the kernel 131 or the middleware 132. The API 133 can include, for example, at least one interface or function for file control, window control, image processing, character control, or the like.

The user input module 140 can, for example, receive an input of an instruction or data from a user and forward the instruction or data to the processor 120 or the memory 130 through the bus 110. The display module 150 can display an image, a picture, data, or the like to the user.

The communication module 160 can connect communication between the electronic device 100 and another electronic device 102. The communication module 160 can support a certain short-range communication protocol (e.g., Wireless Fidelity (WiFi), Bluetooth (BT), or Near Field Communication (NFC)), and certain network communication 162 (e.g., the Internet, a Local Area Network (LAN), a Wide Area Network (WAN), a telecommunication network, a cellular network, a satellite network, a Plain Old Telephone System (POTS), or the like). The electronic device 100 may communicate with another electronic device 104 and/or a server 164 via the network 162. The electronic devices 102 and 104 each can be the same (e.g., the same type of) device as the electronic device 100 or can be a different (e.g., a different type of) device.

Figure 2:
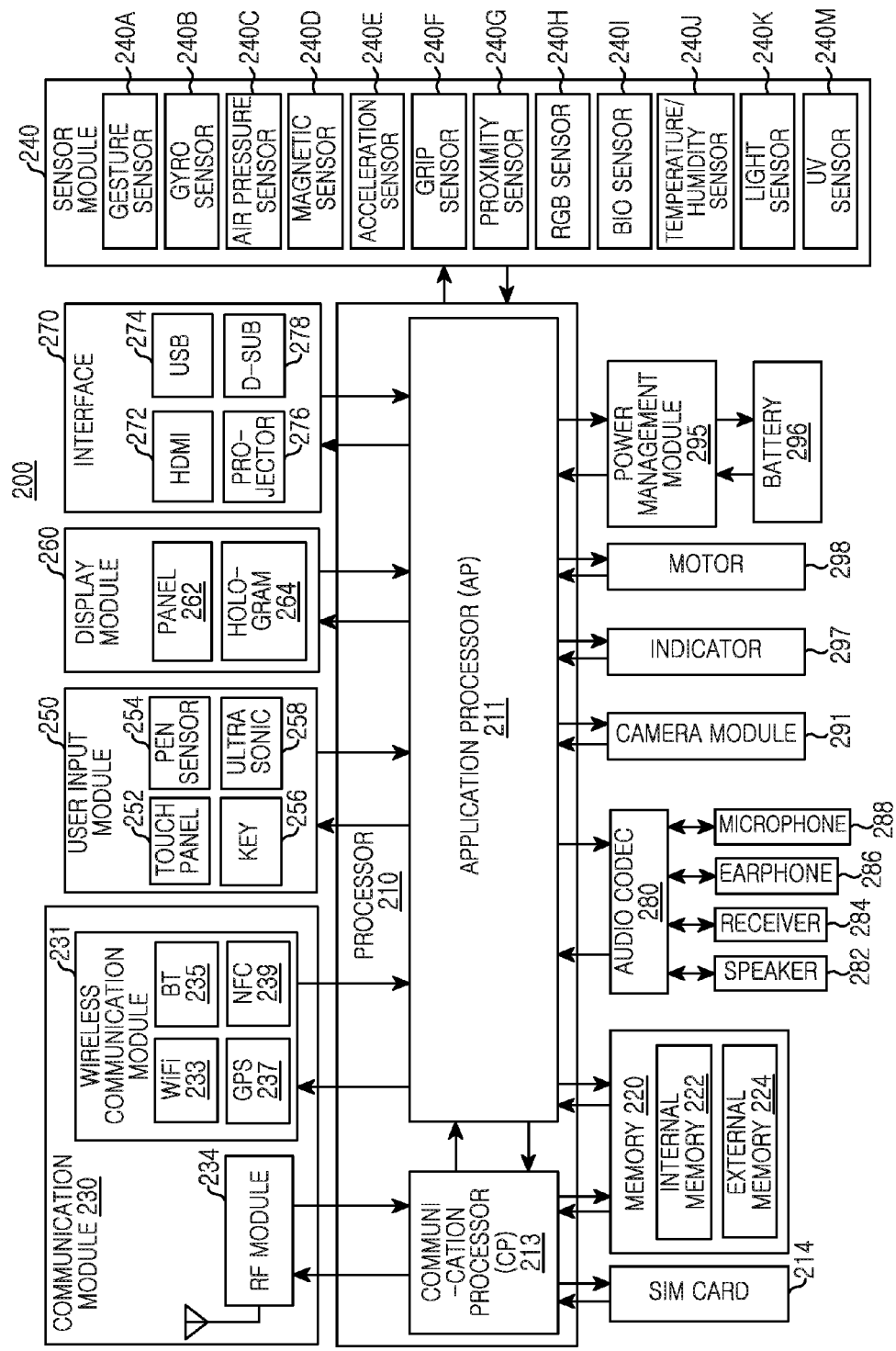
FIG. 2 is a block diagram illustrating a configuration of hardware according to various embodiments of the present disclosure.

FIG. 2 is a block diagram illustrating a configuration of hardware according to various embodiments of the present disclosure.

Referring to FIG. 2, the hardware 200 can be, for example, the electronic device 100 illustrated in FIG. 1. The hardware 200 include one or more processors 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, and a motor 298.

The processor 210 (e.g., the processor 120) can include one or more Application Processors (APs) 211 and/or one or more Communication Processors (CPs) 213. The processor 210 can be, for example, the processor 120 illustrated in FIG. 1. Although FIG. 2 illustrates that the AP 211 and the CP 213 are included within the processor 210, the AP 211 and the CP 213 can be included within different IC packages, respectively. According to various embodiments of the present disclosure, the AP 211 and the CP 213 can be included within one IC package.

The AP 211 can drive an operating system or an application program and control a plurality of hardware or software constituent elements connected to the AP 211, and perform processing and operation of various data including multimedia data. The AP 211 can be, for example, implemented as a System on Chip (SoC). According to various embodiments of the present disclosure, the processor 210 can further include a Graphic Processing Unit (GPU) (not shown). The CP 213 can perform a function of managing a data link and converting a communication protocol in communication between an electronic device (e.g., the electronic device 100) including the hardware 200 and other electronic devices connected through a network. The CP 213 can be implemented as a SoC, for example.

According to various embodiments of the present disclosure, the CP 213 can perform at least part of a multimedia control function. The CP 213 can perform terminal distinction and authorization within a communication network, using a subscriber identity module (e.g., the SIM card 214). In addition, the CP 213 can provide services such as voice call, video call, a text message, packet data, or the like to a user. In addition, the CP 213 can control data transmission/reception of the communication module 230. Although FIG. 2 illustrates the constituent elements such as the CP 213, the power management module 295, the memory 220, and the like as constituent elements separate from the AP 211, according to an embodiment, the AP 211 can be implemented to include at least some (e.g., the CP 213) of the aforementioned constituent elements.

According to various embodiments of the present disclosure, the AP 211 or the CP 213 can load to a volatile memory an instruction or data received from a non-volatile memory connected to each of the AP 211 and the CP 213 or at least one of other constituent elements, and process the loaded instruction or data. In addition, the AP 211 or the CP 213 can store in the non-volatile memory data received from at least one of the other constituent elements or created by at least one of the other constituent elements. The SIM card 214 can be a card implementing the subscriber identity module, and can be inserted into a slot provided in a specific location of the electronic device. The SIM card 214 can include unique identification information (e.g., Integrated Circuit Card ID (ICCID)) or subscriber information (e.g., International Mobile Subscriber Identity (IMSI)).

The memory 220 can include an internal memory 222 and/or an external memory 224. The memory 220 can be, for example, the memory 130 illustrated in FIG. 1. The internal memory 222 can include, for example, at least one of a volatile memory (e.g., a Dynamic Random Access Memory (DRAM), a Static Random Access Memory (SRAM), a Synchronous Dynamic Random Access Memory (SDRAM), and the like) and/or a non-volatile memory (e.g., a One Time PROM (OTPROM), a Programmable ROM (PROM), an Erasable Programmable ROM (EPROM), an Electrically Erasable Programmable ROM (EEPROM), a mask Read Only Memory (ROM), a flash ROM, a Not AND (NAND) flash memory, a Not OR (NOR) flash memory, and the like).

According to various embodiments of the present disclosure, the internal memory 222 can also take a form of Solid State Drive (SSD). The external memory 224 can further include, for example, Compact Flash (CF), Secure Digital (SD), Micro Secure Digital (Micro-SD), Mini Secure Digital (Mini-SD), extreme Digital (xD), a memory stick, and the like.

The communication module 230 can include a wireless communication module 231 and/or a Radio Frequency (RF) module 234. The communication module 230 can be, for example, the communication module 160 illustrated in FIG. 1. The wireless communication module 231 can include, for example, WiFi 233, BT 235, Global Positioning System (GPS) 237, and NFC 239. For example, the wireless communication module 231 can provide a wireless communication function using radio frequency.

Additionally or alternatively, the wireless communication module 231 can include a network interface (e.g., a LAN card), a modem or the like for connecting the hardware 200 with a network (e.g., the Internet, a LAN, a WAN, a telecommunication network, a cellular network, a satellite network, a POTS or the like). The RF module 234 can take charge of transmission/reception of data, for example, transmission/reception of an RF signal or a called electronic signal. The RF module 234 can include, though not illustrated, for example, a transceiver, a Power Amp Module (PAM), a frequency filter, a Low Noise Amplifier (LNA), or the like.

In addition, the RF module 234 can further include a component for transmitting/receiving an electromagnetic wave on a free space in a wireless communication, for example, a conductor, a conductive line or the like.

The sensor module 240 can include, for example, at least one of a gesture sensor 240A, a gyro sensor 240B, an air pressure sensor 240C, a magnetic sensor 240D, an acceleration sensor 240E, a grip sensor 240F, a proximity sensor 240G, a Red, Green, Blue (RGB) sensor 240H, a biological sensor 240I, a temperature/humidity sensor 240J, a light sensor 240K, and a Ultraviolet (UV) sensor 240M. The sensor module 240 can measure a physical quantity or detect an activation state of the electronic device and convert measured or detected information into an electrical signal.

Additionally or alternatively, the sensor module 240 can include, for example, an Electronic nose (E-nose) sensor (not shown), an Electromyography (EMG) sensor (not shown), an Electroencephalogram (EEG) sensor (not shown), an Electrocardiogram (ECG) sensor (not shown), a fingerprint sensor (not shown), and the like. The sensor module 240 can further include a control circuit for controlling at least one or more sensors provided therein.

The user input module 250 can include a touch panel 252, a (digital) pen sensor 254, a key 256, and an ultrasonic input device 258. The user input module 250 can be, for example, the user input module 140 illustrated in FIG. 1. The touch panel 252 can recognize, for example, a touch input in at least one method among a capacitive method, a pressure sensitive method, an infrared method, and an ultrasonic method.

In addition, the touch panel 252 can also include a controller (not shown). In the capacitive method, not only direct touch but also proximity recognition is possible. The touch panel 252 can also include a tactile layer. In this case, the touch panel 252 can provide a tactile response to a user. The (digital) pen sensor 254 can be implemented, for example, in the same or similar method with receiving a user's touch input or using a separate sheet for recognition. The key 256 can be, for example, a keypad or a touch key.

The ultrasonic input device 258 is a device capable of confirming data by detecting a sound wave with a microphone (e.g., a microphone 288) of the electronic device, and can perform wireless recognition through a pen creating an ultrasonic signal.

According to various embodiments of the present disclosure, the hardware 200 can also receive a user input from an external device (e.g., a network, a computer, or a server) connected to the hardware 200 using the communication module 230.

The display module 260 can include a panel 262 and a hologram 264. The display module 260 can be, for example, the display module 150 illustrated in FIG. 1. The panel 262 can be, for example, a Liquid Crystal Display (LCD), an Active-Matrix Organic Light-Emitting Diode (AMOLED), or the like. The panel 262 can be implemented to be flexible, transparent, or wearable, for example. The panel 262 can be also constructed as one module together with the touch panel 252. The hologram 264 can show a three-dimensional image in the air by using interference of light. According to various embodiments of the present disclosure, the display module 260 can further include a control circuit for controlling the panel 262 and the hologram 264.

The interface 270 can include, for example, a High-Definition Multimedia Interface (HDMI) 272, a Universal Serial Bus (USB) 274, a projector 276, and a D-subminiature (D-sub) 278. Additionally or alternatively, the interface 270 can include, for example, Secure Digital (SD)/Multi Media Card (MMC) (not shown) and Infrared Data Association (IrDA) (not shown).

The audio codec 280 can convert a voice and an electric signal interactively. The audio codec 280 can convert, for example, voice information that is inputted or outputted through a speaker 282, a receiver 284, an earphone 286, the microphone 288, and the like.

The camera module 291 is a device capable of taking an image and a video. According to various embodiments of the present disclosure, the camera module 291 can include one or more image sensors (e.g., a front lens or a rear lens), an Image Signal Processor (ISP) (not shown), and a flash LED (not shown).

The power management module 295 can manage power of the hardware 200. Though not illustrated, the power management module 295 can include, for example, a Power Management Integrated Circuit (PMIC), a charger Integrated Circuit (IC), and a battery gauge.

The PMIC can be mounted, for example, within an integrated circuit or a SoC semiconductor. A charging method can be divided into wired and wireless charging method. The charger IC can charge a battery, and can prevent the inflow of overvoltage or overcurrent from an electric charger. According to various embodiments of the present disclosure, the charger IC can include a charger IC for at least one of a wired charging method and a wireless charging method. As an example, the wireless charging method may include a magnetic resonance method, a magnetic induction method, an electromagnetic method and the like. Additional circuits for wireless charging, for example, circuits of a coil loop, a resonance circuit, a rectifier, and the like can be added.

The battery gauge can measure, for example, a level of the battery 296, a voltage in charging, an electric current, and a temperature. The battery 296 can create electricity and supply a power source. The battery 296 can be, for example, a rechargeable battery.

The indicator 297 can display a specific state of the hardware 200 or a part (e.g., the AP 211) thereof, for example, a booting state, a message state, a charging state, and the like.

The motor 298 can convert an electrical signal into a mechanical vibration. A Microcontroller Unit (MCU) (not shown) can control the sensor module 240.

Though not illustrated, the hardware 200 can include a processing device (e.g., a GPU) for mobile TV support. The processing device for mobile TV support can process, for example, standard media data of Digital Multimedia Broadcasting (DMB), Digital Video Broadcasting (DVB), a media flow and the like.

The names of the aforementioned constituent elements of the hardware 200 according to various embodiments of the present disclosure can be varied according to the kind of the electronic device. The hardware 200 according to the various embodiments of the present disclosure can include at least one of the aforementioned constituent elements, and can omit some constituent elements or further include additional other constituent elements. In addition, some of the constituent elements of the hardware 200 according to the various embodiments of the present disclosure can be coupled and constructed as one entity and identically perform the functions of the corresponding constituent elements of before being coupled.

Figure 3:
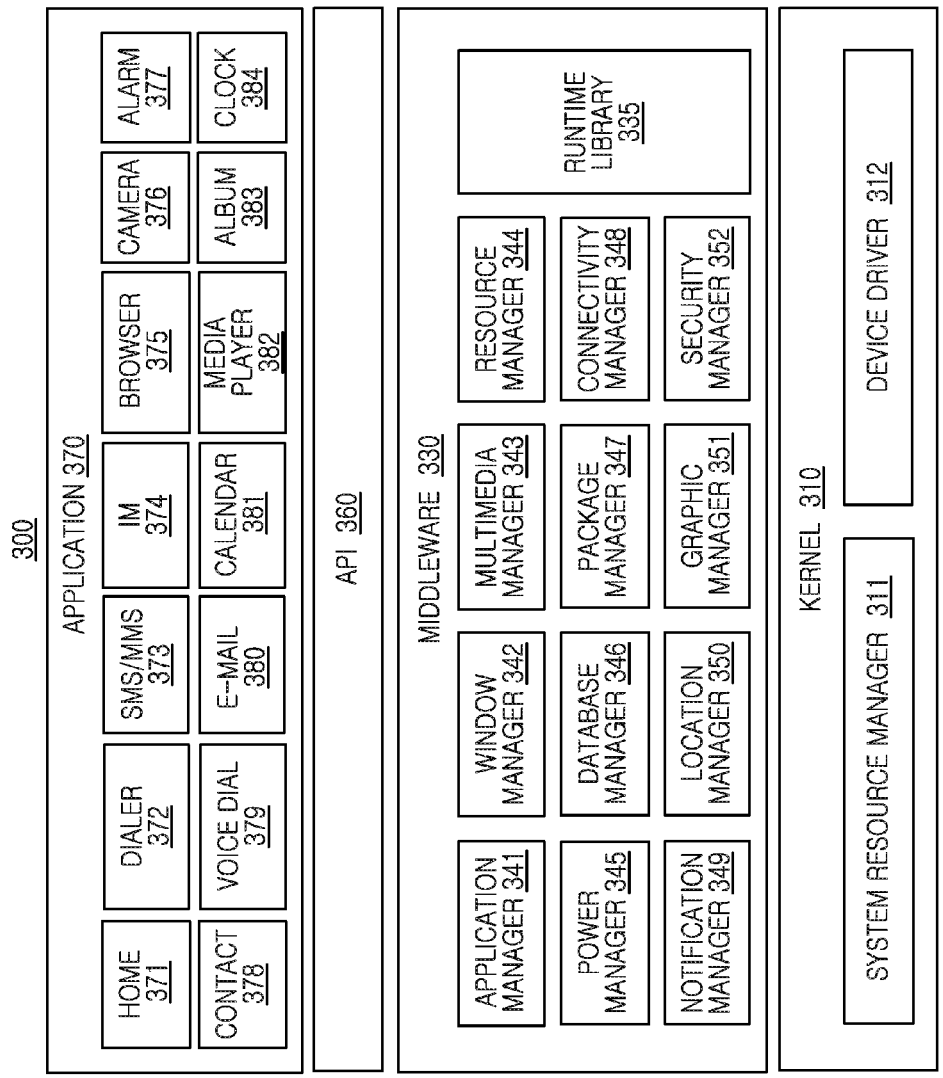
FIG. 3 is a block diagram illustrating a configuration of a programming module according to various embodiments of the present disclosure.

FIG. 3 is a block diagram illustrating a configuration of a programming module according to various embodiments of the present disclosure.

Referring to FIG. 3, the programming module 300 can be included (e.g., stored) in the electronic device 100 (e.g., the memory 130) illustrated in FIG. 1. At least part of the programming module 300 can be constructed by software, firmware, hardware, or a combination of at least two or more of software, firmware, and hardware. The programming module 300 can include an Operating System (OS) implemented in hardware (e.g., the hardware 200) and controlling resources related to the electronic device (e.g., the electronic device 100) or various applications (e.g., the application 370) driven on the operating system. For example, the operating system can be Android, iPhone OS (iOS), Windows, Symbian, Tizen, Badda, or the like.

The programming module 300 can include a kernel 310, a middleware 330, an API 360, and an application 370. The kernel 310 (e.g., the kernel 131) can include a system resource manager 311 and a device driver 312. The system resource manager 311 can perform control of a system resource, allocation thereof, recovery thereof, and the like. In addition, according to various embodiments of the present disclosure, the device driver 312 can include an Inter-Process Communication (IPC) driver (not shown).

The middleware 330 can include a plurality of modules previously implemented to provide a function commonly required by the application 370. In addition, the middleware 330 can provide a function through the API 360 such that the application 370 can make efficient use of a restricted system resource within the electronic device. For example, as illustrated in FIG. 3, the middleware 330 (e.g., the middleware 132) can include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a compiler to add a new function through a programming language while the application 370 is executed. According to various embodiments of the present disclosure, the runtime library 335 can perform a function of input/output, memory management, arithmetic function, and the like.

The application manager 341 can manage, for example, a life cycle of at least one application among the applications 370.

The window manager 342 can manage a GUI resource used in a screen.

The multimedia manager 343 can determine a format necessary for playing various media files, and perform encoding or decoding of a media file using a codec suitable to a corresponding format.

The resource manager 344 can manage a resource such as a source code of at least any one application among the applications 370, a memory, a storage space, and the like.

The power manager 345 can operate together with a Basic Input/Output System (BIOS) and the like to manage a battery or power source, and provide power information and the like necessary for the operation.

The database manager 346 can manage to create, search or change a database to be used in at least one application among the applications 370.

The package manager 347 can manage installation or updating of an application which is distributed in a form of a package file.

The connectivity manager 348 can manage, for example, wireless connection such as WiFi, Bluetooth and the like.

The notification manager 349 can display or notify an event such as an arrival message, an appointment, a proximity notification and the like in a way not giving a disturbance to a user.

The location manager 350 can manage location information of the electronic device.

The graphic manager 351 can manage a graphic effect to be provided to the user or a user interface related to this.

The security manager 352 can provide a general security function necessary for system security, user authentication and the like.

According to various embodiments of the present disclosure, if the electronic device (e.g., the electronic device 100) has a phone function, the middleware 330 can further include a telephony manager (not shown) for managing a voice or video call function of the electronic device. The middleware 330 can create and use a new middleware module through a combination of various functions of the aforementioned internal constituent element modules. The middleware 330 can provide a module specialized by kind of an operating system so as to provide a differentiated function.

In addition, the middleware 330 can dynamically remove some of the existing constituent elements or add new constituent elements. Accordingly, the middleware 330 can omit some of the constituent elements stated in an embodiment of the present disclosure, or further include other constituent elements, or substitute with constituent elements of different names performing similar functions.

The API 360 (e.g., the API 133) is a set of API programming functions, and can be provided to have other construction in accordance to an operating system. For example, in a case of Android or iOS, the API 360 can provide, for example, one API set by platform and, in a case of Tizen, the API 360 can provide, for example, two or more API sets.

The application 370 (e.g., the application 134) can, for example, include a preloaded application or a third party application. At least part of the programming module 300 can be implemented by an instruction stored in a non-transitory computer-readable storage medium. When the instruction is executed by one or more processors (e.g., the processor 210), the one or more processors perform a function corresponding to the instruction. The application 370 may be or otherwise include one or more of a home application 371, a dialer application 372, a short messaging service (SMS)/multimedia messaging service (MMS) application 373, an instant messaging (IM) application 374, a browser application 375, a camera application 376, an alarm application 377, a contacts application 378, a voice dial application 379, an email application 380, a calendar application 381, a media player application 382, an album application 383, a clock application 384, and/or the like.

The computer-readable storage medium (e.g., a non-transitory computer readable storage medium) can be, for example, the memory 260. At least part of the programming module 300 can be, for example, implemented (e.g., executed) by the processor 210. At least part of the programming module 300 can, for example, include a module, a program, a routine, an instruction set, a process, or the like for performing one or more functions. The names of the constituent elements of the programming module (e.g., the programming module 300) according to various embodiments of the present disclosure can be varied in accordance to the kind of an operating system. In addition, the programming module according to the various embodiments of the present disclosure can include at least one or more of the aforementioned constituent elements, or omit some of the aforementioned constituent elements, or further include additional other constituent elements.

An operation principle of various embodiments of the present disclosure will be described herein below with reference to the accompanying drawings. In describing the various embodiments of the present disclosure below, well-known functions or constructions are not described in detail because a description of such well-known functions or constructions would obscure the disclosure in unnecessary detail. In addition, terms described below, which are defined considering functions in the present disclosure, can be modified in accordance to user and operator's intention or practice. Therefore, the definition should be given on the basis of the content throughout the present specification.

A broadcast channel information sharing method of an electronic device and the electronic device thereof according to various embodiments of the present disclosure are described below in detail. The electronic device according to the various embodiments of the present disclosure can include the constituent elements illustrated in FIG. 3.

Figure 4:
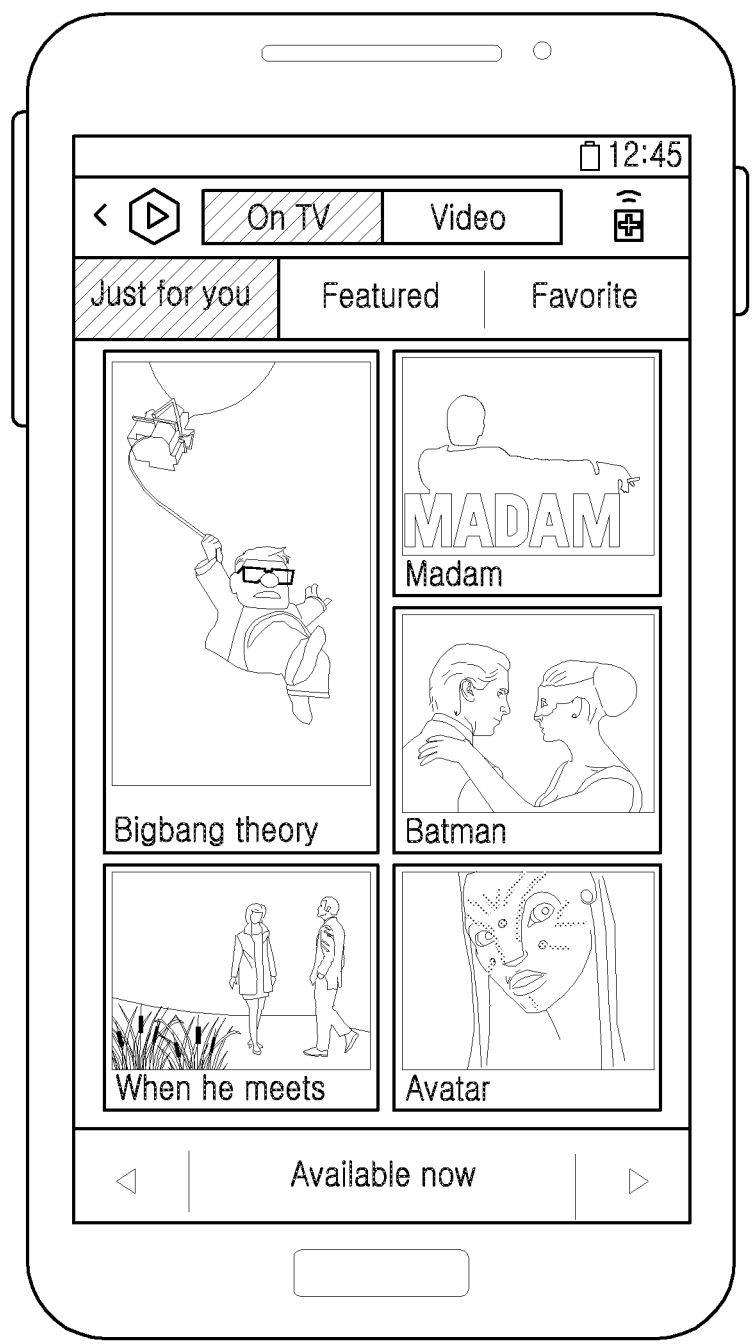
FIG. 4 is a diagram illustrating an Electronic Program Guide (EPG) screen of an electronic device according to various embodiments of the present disclosure.

FIG. 4 is a diagram illustrating an Electronic Program Guide (EPG) screen of an electronic device according to various embodiments of the present disclosure.

Referring to FIG. 4, an electronic device of various types such as a smart phone, a tablet PC or the like can display digital broadcast channel information and the like through an Electronic Program Guide (EPG) screen in which a User Interface (UI) is possible.

The EPG screen can display, on a user interface screen in which user selection is possible, a list in which a thumbnail picture representing each broadcasting program, a broadcasting program name and the like are linked as one pair. However, the electronic device may or may not have a tuner for receiving digital broadcasting. Without the tuner, the electronic device may be unable to receive EPG information provided through digital broadcasting.

The electronic device without the tuner communicates with a cloud computing based network server, and receives and shares broadcast channel information of another electronic device associated with any one or more of user information, location information, and habit information. The user information includes information for identifying a user of the electronic device. The location information includes information for identifying a current location of the electronic device. The habit information can include a watching channel that the user of the electronic device has watched, a prefer channel, or the like.

A user of a first electronic device to which various embodiments of the present disclosure are applied can receive broadcast channel information of another electronic device possessed by self, for example, another electronic device such as an IP-TV with a tuner and the like, from the cloud computing based network server, and share the received broadcast channel information of another electronic device as broadcast channel information of the first electronic device. In addition, the user of the first electronic device can receive broadcast channel information of another electronic device located in the same area as a current area in which the first electronic device is located or an adjacent area of an allowed range, from the cloud computing based network server, and share the received broadcast channel information of the other electronic device as broadcast channel information of the first electronic device.

In addition, the user of the first electronic device can receive broadcast channel information of an electronic device possessed by any user who has the same habit as the user of the first electronic device own broadcast watching habit or a similar habit within an allowed range, such as a watching channel, a prefer channel or the like, from the cloud computing based network server, and share the received broadcast channel information as broadcast channel information of the first electronic device.

Figure 5:
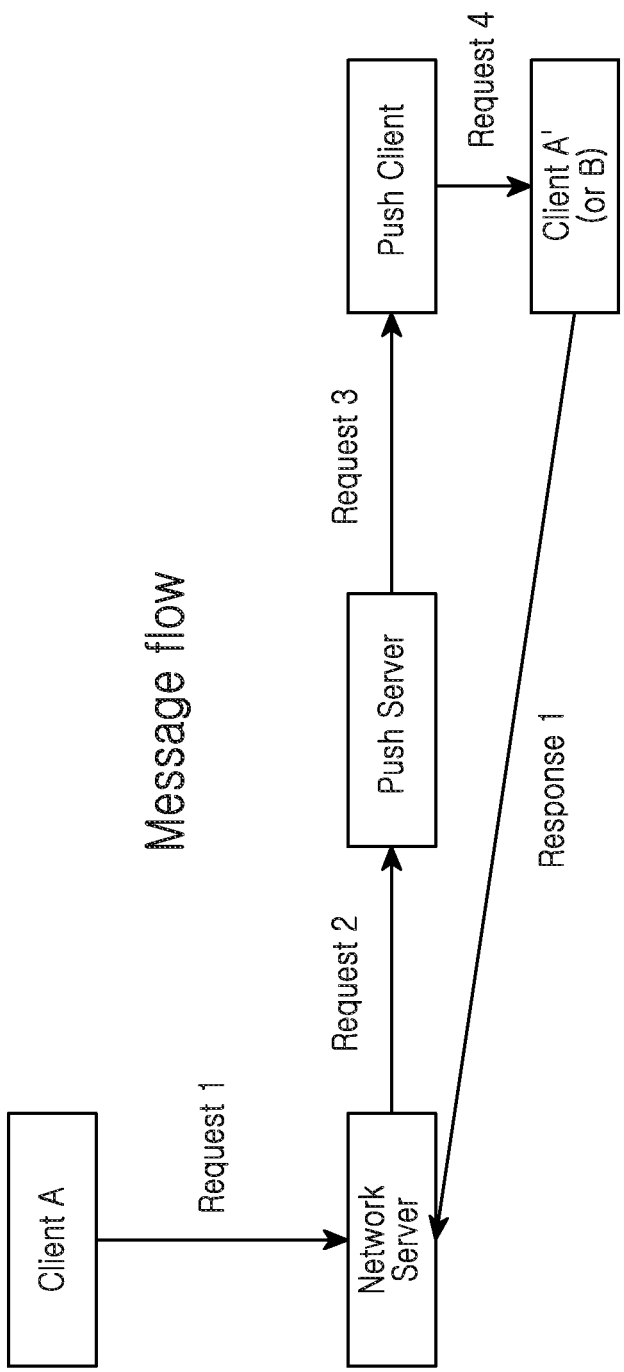
FIG. 5 is a diagram illustrating a process of transmitting/receiving a request message and a response message according to various embodiments of the present disclosure.

FIG. 5 is a diagram illustrating a process of transmitting/receiving a request message and a response message according to an embodiment of the present disclosure.

Referring to FIG. 5, it is assumed that a first electronic device such as a smart phone, a tablet PC or the like to which an embodiment of the present disclosure is applied is a client A. If the client A does not have a tuner for receiving digital broadcasting, the client A cannot receive EPG information provided through the digital broadcasting. The client A creates a request message of requesting to share broadcast channel information in accordance to a user's request and the like and then, transmits the request message to a cloud computing based network server.

The cloud computing signifies an Internet based computer technology. The cloud signifies a complicated infrastructure of a computer network. The cloud computing signifies a use environment that a user can use anytime through Internet access without installing a required software in its own computer and concurrently, can easily share data through various kinds of information telecommunication instruments.

FIG. 6 is a diagram illustrating a configuration of a channel information database according to various embodiments of the present disclosure. FIG. 7 is a diagram illustrating user habit information stored in a channel information database according to various embodiments of the present disclosure. FIG. 8 is a diagram illustrating a configuration of a request message according to various embodiments of the present disclosure. FIG. 9 is a diagram illustrating a configuration of a request message according to various embodiments of the present disclosure. FIG. 10 is a diagram illustrating a configuration of a response message according to various embodiments of the present disclosure.

Referring to FIGS. 6-10, the network server can be variously called a cloud server, a channel information providing server, or the like. The network server can manage various broadcast channel information in a database. For example, as illustrated in FIG. 6, a channel information database managed by the network server can include user information, user location information, channel set information, and the like.

The user information includes a user IDentifier (ID), a user name, authentication information and the like, and can be used as a user authentication token for user identification and authentication. The user authentication token is one of user authentication information which are widely used in a computer security device, a smart card, an Internet system and the like. The user location information can include a user ID, a country code, area identification information (e.g., a zip code), a broadcasting operator ID, and the like. The country code is location information of a wide area indicating a country in which an electronic device is located. The area identification information is location information of a narrow area corresponding to a zip code and the like of an area in which the electronic device is located.

The area identification information may be mandatory information, and the country code can be classified as optional information. The broadcasting operator ID can be used as identification information for identifying an operator ID providing a channel within a corresponding area. The channel set information can include a channel set ID, a provider ID, a provider name, a channel ID, channel information, a channel name, a prefer channel or not, and the like.

In addition, the channel information database can further include user habit information, for example, as illustrated in FIG. 7. The user habit information is information indicating a unique broadcast watching habit of a user. For example, the user habit information can include various information related to a user's watching habit, such as a user ID, an activity type, Video On Demand (VOD) watching or not, a provider ID, a channel ID, a title, a genre, an on air time start, an on air time end, an activity time, pay or not, a prefer channel or not, a search history and the like.

A request message (e.g., Request 1) transmitted from the client A to the network server as illustrated in FIG. 5 can be, for example, distinguished into a URL, a header, a body and the like as illustrated in FIG. 8. The body can include a user token for user authentication, a country code indicating an area, area identification information (e.g., a zip code), and the like. The user token can be called a user authentication token. Further, the body can include user habit information (not shown), a local terrestrial broadcasting operator ID (e.g., stv), and the like.

The network server can operate as one independent server, or operate interworking with a server of another platform in which various data have been already consolidated such that broadcast channel information and the like can be shared. For example, it is assumed below that the server of the other platform is a push server. For reference, a push technology of a network represents a technology of automatically, periodically directly pushing the latest information to a computer screen if a user only selects a list of interested information using an Internet environment.

The push technology, a technology in which a server automatically provides information desired by a user, is one technology automated such that the user can receive, though not requesting every time, specific information. A request message (e.g., Request 2) transmitted from the network server to a push server as illustrated in FIG. 5 can include a user token, a country code, area identification information, a local terrestrial broadcasting operator ID (e.g., stv), and the like and further, can additionally include a server authentication token (e.g., SVR authToken) and the like for authenticating the network server.

The push server can be operated interworking with a previously registered client such that broadcast channel information and the like can be shared. For example, it is assumed that the above previously registered client is a push client. A request message (e.g., Request 3) transmitted from the push server to the push client as illustrated in FIG. 5 can include a user token, a country code, area identification information, a local terrestrial broadcasting operator ID, and the like as described above with reference to FIG. 9 and further, can additionally include a server authentication token and the like for authenticating the network server.

The push client transmits a request message (e.g., Request 4) to another electronic device possessed by a user of the client A, for example, another electronic device such as an IP-TV with a tuner and the like, based on the user information of the client A. For example, it is assumed that the other electronic device possessed by the user of the client A is a client A'. Alternately, the push client can transmit the request message (e.g., Request 4) to another electronic device located in the same area as a current area in which the client A is located or in an adjacent area of an allowed range, for example, to another electronic device such as an IP-TV with a tuner and the like, based on the location information of the client A. For example, it is assumed that the other electronic device located in the same area or the adjacent area is a client B.

Meantime, after the client A or the client B creates a response message (e.g., Response 1) correspondingly to the request message (e.g., Request 4) of the push client, the client A' or the client B transmits the created response message (e.g., Response 1) to the network server. The response message can include broadcast channel information and the like of the client A or the client B. For example, as illustrated in FIG. 10, the response message can include a channel count indicating the number of channel lists, at least one or more channel lists, and the like.

The channel list can include a channel provider ID, a channel provider name, a channel ID, a channel name, a prefer channel or not, and the like. As illustrated in FIG. 5, the request messages (e.g., Requests 1 to 4) and the response message (e.g., Response 1) may be transmitted in a one-way method that is an exclusive transmission method going through a one-way communication path, or be transmitted/ received in various two-way communication methods.

The network server can be operated independently without interworking with the push server and the push client. Further, the network server may be operated as a comprehensive server of an upper concept which includes the push server, the push client, and the like. Below, a detailed description is made for an embodiment of the present disclosure in which the network server is operated as the comprehensive server.

Figure 11:
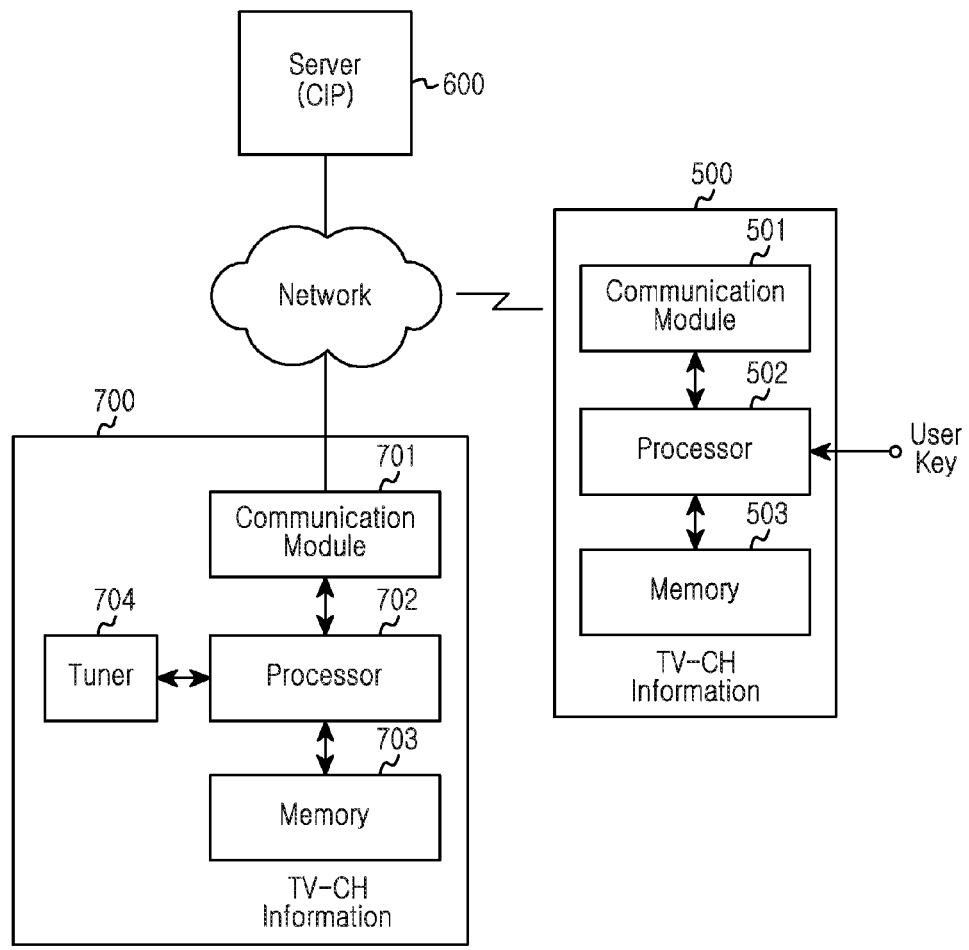
FIG. 11 is a block diagram illustrating a main configuration of an electronic device according to various embodiments of the present disclosure.
Figure 12:
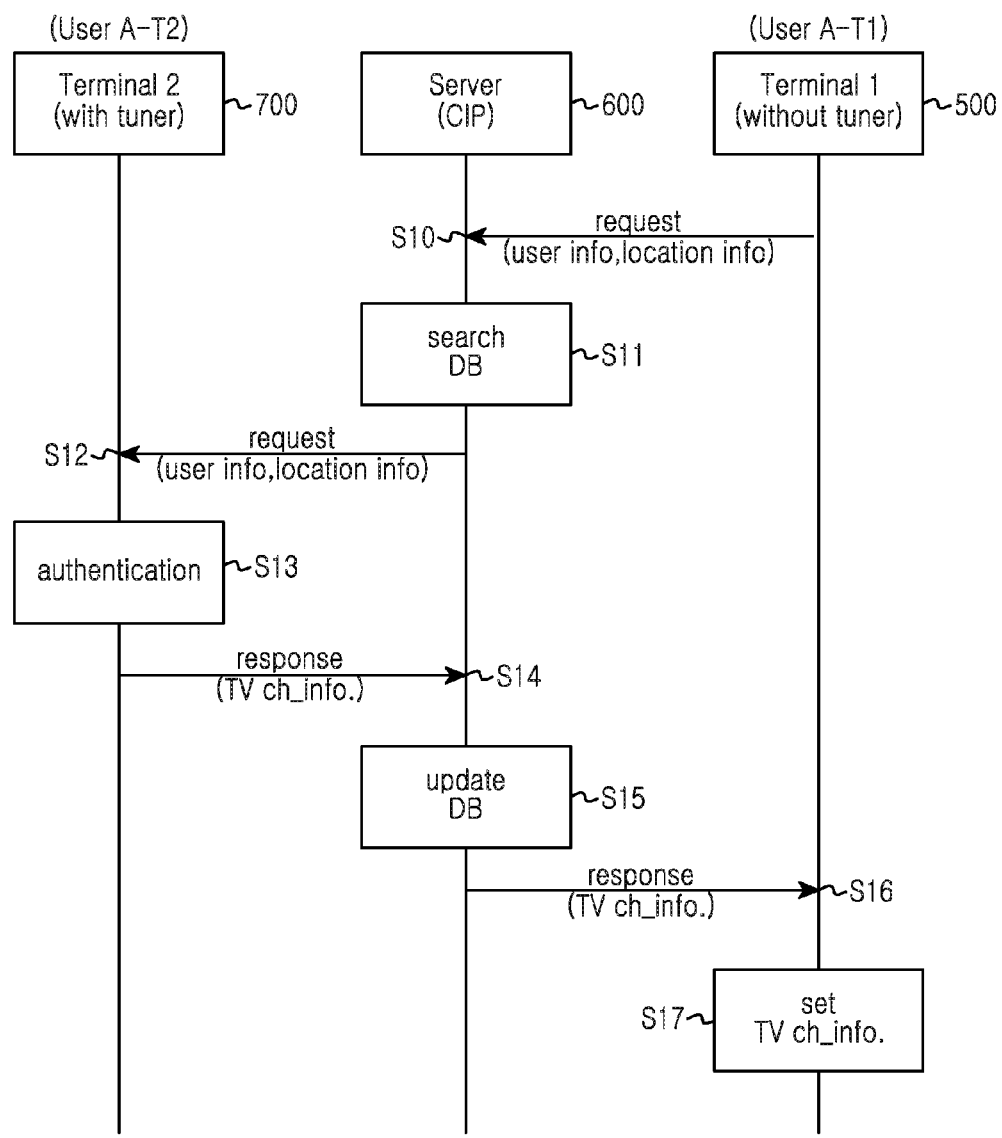
FIG. 12 is a ladder diagram illustrating an operation of a method for sharing broadcast channel information in an electronic device according to various embodiments of the present disclosure.

FIG. 11 is a block diagram illustrating a main configuration of an electronic device according to various embodiments of the present disclosure. FIG. 12 is a ladder diagram illustrating an operation of a method for sharing broadcast channel information in an electronic device according to various embodiments of the present disclosure.

Referring to FIGS. 11 and 12, a first electronic device 500 of various types such as a smart phone, a tablet PC, or the like to which an embodiment of the present disclosure is applied includes a communication module 501, a processor 502, a memory 503, and the like, but may not include a tuner and the like for receiving digital broadcasting. The first electronic device 500 can be called a first terminal (terminal 1) 500 on a network.

In addition, a second electronic device 700 of various types such as an IP-TV and the like can include a communication module 701, a processor 702, a memory 703, a tuner 704 for receiving digital broadcasting, and the like. The second electronic device 700 can be called a second terminal (terminal 2) on the network.

In addition, a network server 600 communicating with the first terminal 500 and the second terminal 700 through the network can be called a Channel Information Provider (CIP) server and the like providing broadcast channel information and the like.

For example, the first terminal 500 and the second terminal 700 are electronic devices possessed by the same user (e.g., a user A). The first terminal 500 can be a smart phone without a tuner, and the second terminal 700 can be an IP-TV with a tuner. As illustrated in FIG. 12, the processor 502 of the first terminal 500 transmits a request message of requesting to share broadcast channel information, to the network server 600, in accordance to a user's request and the like at operation S10. The request message includes user information, location information and the like described above with reference to FIG. 6. Further, the request message can include user habit information and the like described above with reference to FIG. 7.

The network server 600 searches a database corresponding to the request message at operation S11. For example, if another electronic device possessed by the same user (e.g., a user A) is the second terminal 700, based on the user information included in the request message, the network server 600 transmits a request message of requesting to share broadcast channel information, to the second terminal 700 at operation S12.

The request message transmitted from the network server 600 to the second terminal 700 can include user information, location information, and the like. Further, the request message can include a server authentication token (SVR authToken) and the like described above with reference to FIG. 9. The processor 702 of the second terminal 700 confirms the server authentication token (SVR authToken) included in the request message and authenticates the network server 600 at operation S13. If the authentication result is effective, the processor 702 of the second terminal 700 creates a response message including broadcast channel information stored in the memory 703 of the second terminal 700 and then, transmits the response message to the network server 600 at operation S14.

The response message can include a channel count indicating the number of channel lists, at least one or more channel lists, and the like as described above with reference to FIG. 10. The channel list can include a channel provider ID, a channel provider name, a channel ID, a channel name, a prefer channel or not, and the like.

The network server 600 performs an update operation of storing the broadcast channel information of the second terminal 700 included in the response message, within a database at operation S15, and creates a response message including the broadcast channel information of the second terminal 700 and then transmits the response message to the first terminal 500 at operation S16. The response message transmitted from the network server 600 to the first terminal 500 can include a server authentication token (SVR authToken) and the like for authenticating the network server 600.

The processor 502 of the first terminal 500 extracts the broadcast channel information included in the response message and then, stores the extracted broadcast channel information in the memory 503 of the first terminal 500 and performs a broadcast channel setting operation at operation S17. As a result, the first terminal 500 of the user A can receive the broadcast channel information of the second terminal 700 possessed by the same user A through communication with the network server 600, and easily share the received broadcast channel information with the second terminal 700.

Figure 13:
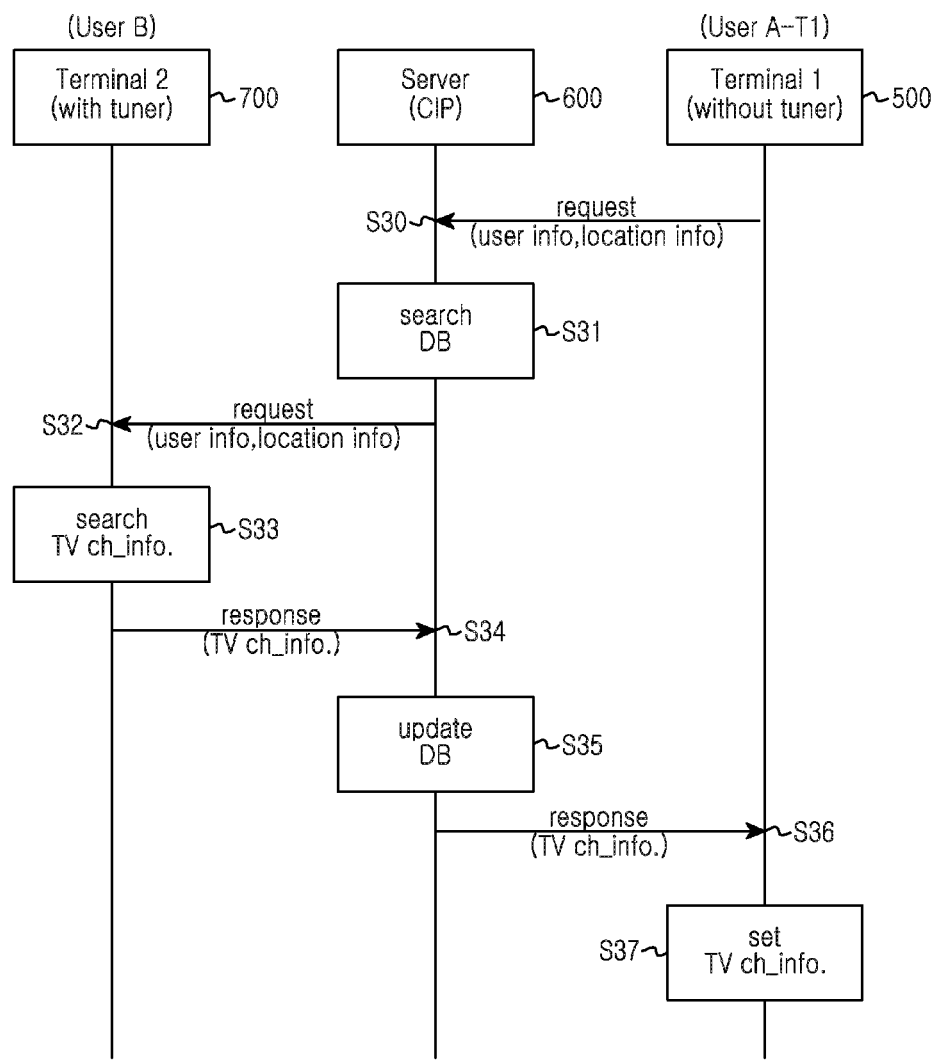
FIG. 13 is a ladder diagram illustrating an operation of a method for sharing broadcast channel information in an electronic device according to various embodiments of the present disclosure.

FIG. 13 is a ladder diagram illustrating an operation of a method for sharing broadcast channel information in an electronic device according to various embodiments of the present disclosure.

Referring to FIG. 13, a first electronic device 500 to which an embodiment of the present disclosure is applied includes a communication module 501, a processor 502, a memory 503, and the like, but may not include a tuner and the like for receiving digital broadcasting. The first electronic device 500 can be called a first terminal (terminal 1) 500 on a network.

In addition, a second electronic device 700 can include a communication module 701, a processor 702, a memory 703, a tuner 704 for receiving digital broadcasting, and the like. The second electronic device 700 can be called a second terminal (terminal 2) on the network. For example, the first terminal 500 can be a smart phone, a tablet PC or the like possessed by a user A, and the second terminal 700 can be an IP-TV and the like possessed by a user B.

As illustrated in FIG. 13, the processor 502 of the first terminal 500 transmits a request message of requesting to share broadcast channel information, to the network server 600, in accordance to a user's request and the like at operation S30. The request message includes user information, location information and the like described above with reference to FIG. 6. Further, the request message can include user habit information and the like described above with reference to FIG. 7.

The network server 600 searches a database corresponding to the request message at operation S31.

For example, if another electronic device possessed by the same user A does not exist based on the user information included in the request message, the processor 502 of the first terminal 500 searches other electronic devices located in the same area or an adjacent area of an allowed range, based on the location information included in the request message. If one of the searched other electronic devices is the second terminal 700, the network server 600 transmits a request message of requesting to share broadcast channel information, to the second terminal 700 at operation S32.

The request message can be transmitted to electronic devices of a user who has been previously registered to or has agreed with a broadcast channel information sharing service or at least one or more electronic devices which are located in the same area as a current location of the first terminal 500 or an adjacent area of an allowed range. The request message transmitted from the network server 600 to the second terminal 700 can include user information, location information and the like, and can include a server authentication token (SVR authToken) and the like for authenticating the network server as described above with reference to FIG. 9.

The processor 702 of the second terminal 700 confirms the server authentication token (SVR authToken) included in the request message, and authenticates the network server 600 at operation S33.

If the authentication result is effective, the processor 702 of the second terminal 700 creates a response message including broadcast channel information stored in the memory 703 of the second terminal 700 and then, transmits the created response message to the network server 600 at operation S34. The response message can include a channel count indicating the number of channel lists, at least one or more channel lists, and the like as described above with reference to FIG. 10.

The channel list can include a channel provider ID, a channel provider name, a channel ID, a channel name, a preferred channel or not, and the like. The network server 600 performs an update operation of storing the broadcast channel information of the second terminal 700 included in the response message, within a database at operation S35. The network server 600 creates a response message including the broadcast channel information of the second terminal 700 and then, transmits the created response message to the first terminal 500 at operation S36.

The response message transmitted to the first terminal 500 can include a server authentication token (SVR authToken) and the like for authenticating the network server 600. The processor 502 of the first terminal 500 extracts the broadcast channel information included in the response message and then, stores the extracted broadcast channel information in the memory 503 and performs a broadcast channel setting operation at operation S37. As a result, the first terminal 500 of a user A can receive the broadcast channel information of the second terminal 700 of a user B located in the same area or an adjacent area of an allowed range through communication with the network server, and simply and conveniently share the received broadcast channel information with the second terminal 700.

Figure 14:
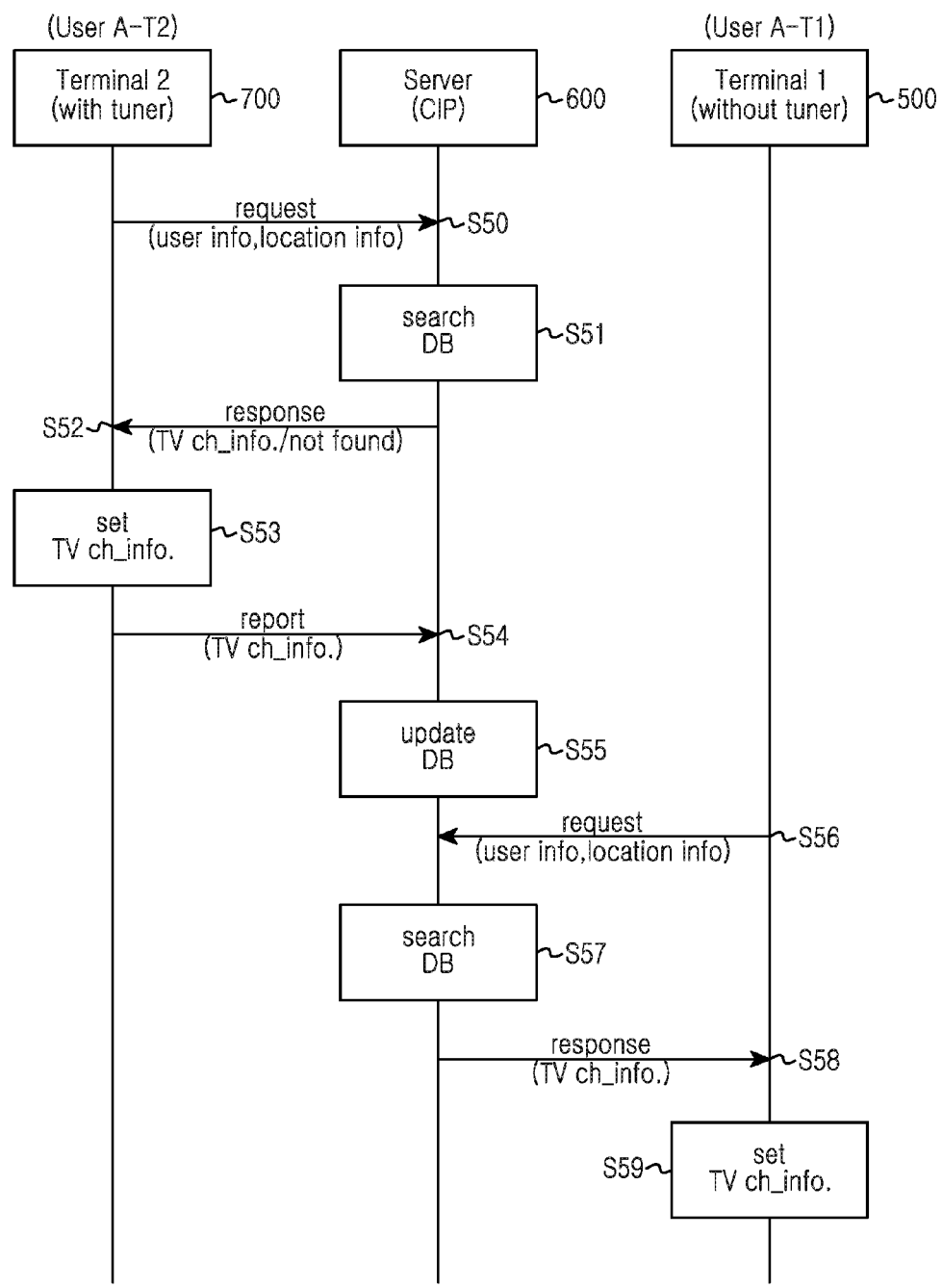
FIG. 14 is a ladder diagram illustrating an operation of a method for sharing broadcast channel information in an electronic device according to various embodiments of the present disclosure.

FIG. 14 is a ladder diagram illustrating an operation of a method for sharing broadcast channel information in an electronic device according to various embodiments of the present disclosure.

Referring to FIG. 14, a first electronic device 500 to which a further embodiment of the present disclosure is applied includes a communication module 501, a processor 502, a memory 503, and the like, but may not include a tuner and the like for receiving digital broadcasting. The first electronic device 500 can be called a first terminal (terminal 1) 500 on a network.

A second electronic device 700 can include a communication module 701, a processor 702, a memory 703, a tuner 704 for receiving digital broadcasting, and the like. The second electronic device 700 can be called a second terminal (terminal 2) on the network.

In addition, a network server 600 communicating with the first terminal 500 and the second terminal 700 can be called a CIP server and the like providing broadcast channel information, and the like.

The network server 600 periodically communicates with electronic devices of a user who has been previously registered or has agreed with a broadcast channel information sharing service, and performs an update operation of receiving broadcast channel information of the electronic devices, user information, location information, habit information, and the like and stores the received information in a database.

The network server 600 can more quickly provide the broadcast channel information sharing service, based on the broadcast channel information, the user information, the location information, the habit information, and the like of the above updated database.

For example, the first terminal 500 and the second terminal 700 can be a smart phone and an IP-TV possessed by the same user (e.g., a user A). As illustrated in FIG. 14, the processor 702 of the second terminal 700 transmits a request message of requesting to share broadcast channel information, to the network server 600, in accordance to a user's request and the like at operation S50. The request message includes user information, location information and the like described above with reference to FIG. 6 and, further, can include user habit information and the like described above with reference to FIG. 7.

The network server 600 searches a database corresponding to the request message at operation S51 and then, creates a response message and transmits the response message to the second terminal 700 at operation S52.

For example, the network server 600 searches whether broadcast channel information of other electronic device possessed by the same user has been stored in the database, based on the user information included in the request message. If the broadcast channel information exists as the search result, the network server 600 includes the broadcast channel information in the response message and transmits the response message to the second terminal 700.

In contrast, if the broadcast channel information based on the user information does not exist, the network server 600 searches whether broadcast channel information of another electronic device located in the same area or an adjacent area of an allowed range has been stored in the database based on the location information included in the request message. If the broadcast channel information exists as the search result, the network server 600 includes the broadcast channel information in the response message and transmits the response message to the second terminal 700.

In addition, if the broadcast channel information based on the location information does not exist, the network server 600 confirms whether the user habit information has been included in the request message and then, searches whether broadcast channel information of another electronic device having the same habit or a similar habit of an allowed range has been stored in the database, based on the user habit information. If the broadcast channel information exists as the search result, the network server 600 includes the broadcast channel information in the response message and transmits the response message to the second terminal 700. If the broadcast channel information based on the habit information does not exist, the network server 600 includes information notifying a broadcast channel information search failure (not found) in the response message and transmits the response message to the second terminal 700.

An operation of searching the broadcast channel information based on the habit information can be performed over a wider area of an allowed range than when searching the broadcast channel information based on the location information. The processor 702 of the second terminal 700 extracts the broadcast channel information included in the response message and then, stores the extracted broadcast channel information in a non-volatile memory 703 of the second terminal 700 and the like and performs a broadcast channel setting operation at operation S53.

In contrast, if the information notifying the broadcast channel information search failure (not found) is included in the response message, the processor 702 of the second terminal 700 controls an operation of the tuner 704 and receives EPG information and the like provided through digital broadcasting and then, directly sets the broadcast channel information. If the broadcast channel setting operation is completed, the processor 702 of the second terminal 700 creates a report message including the broadcast channel information, the user information, the location information, the habit information and the like and transmits the report message to the network server 600 at operation S54.

The network server 600 performs an update operation of adding the broadcast channel information of the second terminal 700 within the database, in association with the user information, the location information, the habit information and the like at operation S55. Thereafter, the network server 600 uses the broadcast channel information for the broadcast channel information sharing service.

The processor 502 of the first terminal 500 without a tuner transmits a request message of requesting to share the broadcast channel information, to the network server 600, in accordance to a user's request and the like at operation S56. The request message includes user information, location information and the like as described above and, further, can include user habit information and the like.

The network server 600 searches a database corresponding to the request message at operation S57 and then, creates a response message and transmits the response message to the first terminal 700 at operation S58.

The network server 600 searches whether broadcast channel information of another electronic device possessed by the same user has been stored in the database, based on the user information included in the request message. For example, if the second terminal 700 is another electronic device possessed by a user of the first terminal 500 and the broadcast channel information of the second terminal 700 exists within the database, the network server 600 includes the broadcast channel information of the second terminal 700 in the response message and transmits the response message to the first terminal 500.

The processor 502 of the first terminal 500 extracts the broadcast channel information of the second terminal 700 included in the response message and then, stores the extracted broadcast channel information in the non-volatile memory 503 of the first terminal 500 and the like and performs a broadcast channel setting operation at operation S59. As a result, the first terminal 500 of a user A can more quickly receive the broadcast channel information of the second terminal 700 possessed by the same user A through communication with the network server 600, and share the received broadcast channel information with the second terminal 700. In addition, the network server 600 can search broadcast channel information of electronic devices of various kinds previously stored in the database based on the user information, the location information, the habit information and the like, and more quickly provide a broadcast channel information sharing service.

Figure 15:
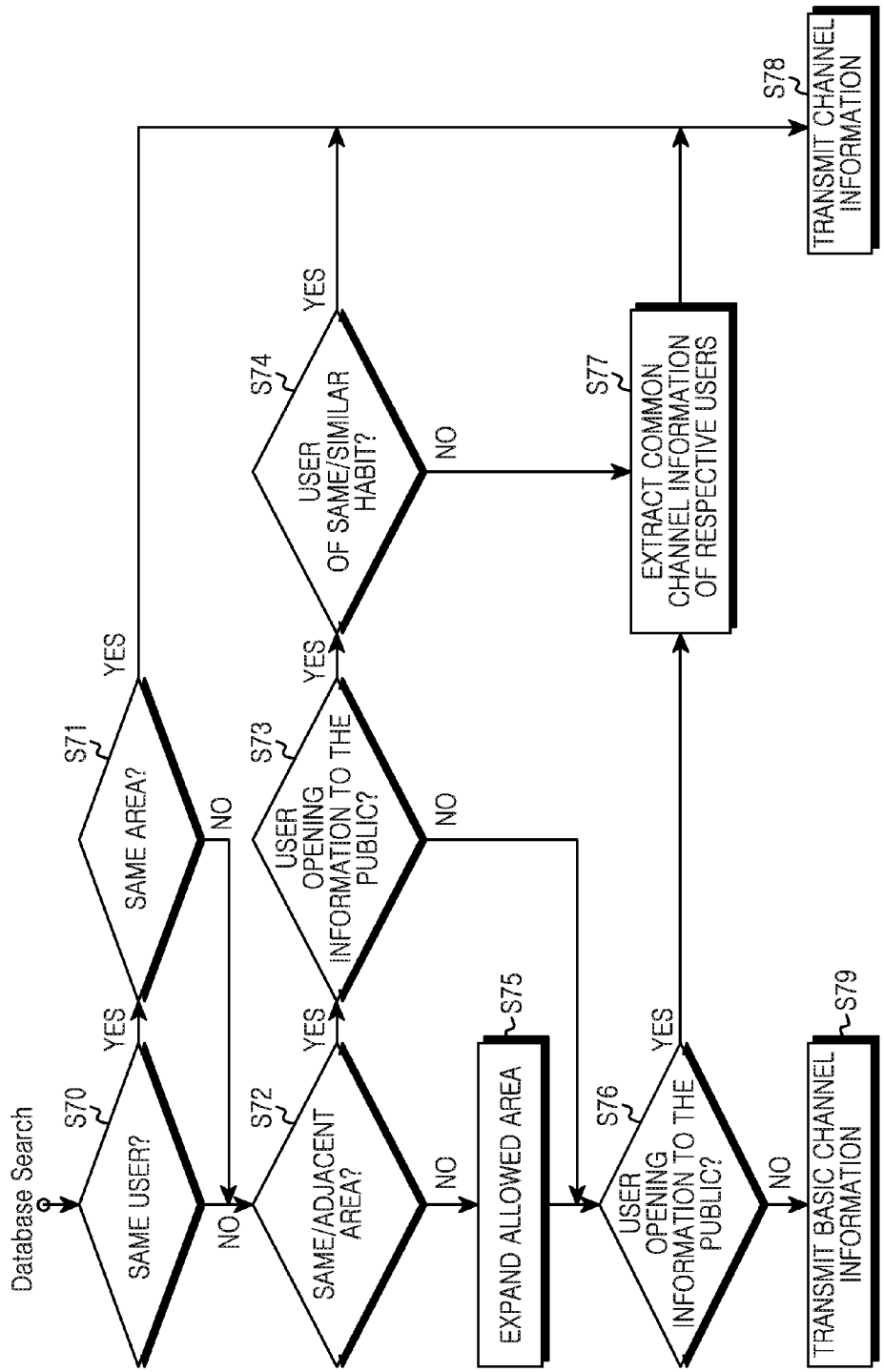
FIG. 15 is a flowchart illustrating an operation of a method for sharing broadcast channel information in a network server according to various embodiments of the present disclosure.

FIG. 15 is a flowchart illustrating an operation of a method for sharing broadcast channel information in a network server according to various embodiments of the present disclosure.

According to various embodiments of the present disclosure, if a request message of requesting to share broadcast channel information is received, for example, from the first terminal 500, the network server 600 confirms user information, location information, habit information and the like included in the request message.

Thereafter, the network server 600 searches a database, and provides broadcast channel information of another electronic device based on the user information, or provides broadcast channel information of another electronic device based on the location information, or provides broadcast channel information of another electronic device based on the habit information.

For example, referring to FIG. 15, the network server 600 searches for an electronic device being an electronic device of the same user as that of the first terminal at operation S70 and being an electronic device of the same area at operation S71, and transmits a response message including broadcast channel information of the searched electronic device, to the first terminal at operation S78.

In contrast, if the electronic device satisfying the above condition is not found, the network server 600 searches for an electronic device being an electronic device of the same area or an adjacent area of an allowed range at operation S72 and being an electronic device of a user who opens information to the public at operation S73 and being an electronic device of a user who has the same habit or a similar habit of an allowed range at operation S74, and transmits a response message including broadcast channel information of the searched electronic device, to the first terminal at operation S78.

Alternately, if electronic devices being electronic devices of the same area or an adjacent area of an allowed range and being electronic devices of users who open information to the public but being electronic devices of users who do not have the same habit or a similar habit of an allowed range are found, the network server 600 may extract common channel information of the respective users who possess the searched electronic devices at operation S77, and create the response message and then transmit the response message to the first terminal at operation S78.

In addition, if the electronic device satisfying the above condition is not found, the network server 600 expands an area of an allowed range at operation S75, and searches electronic devices being electronic devices within the expanded area of the allowed range and being electronic devices of users who open information to the public at operation S76. The network server 600 extracts common channel information of the respective users possessing the searched electronic devices at operation S77, and creates the response message and then transmits the response message to the first terminal at operation S78.

In contrast, if the electronic device satisfying the above condition is not found, the network server 600 determines that the network server 600 can no longer search for another electronic device based on the user information, the location information, the habit information and the like. In this case, the network server 600 creates a response message including previously set basic broadcast channel information and transmits the response message to the first terminal at operation S79. The basic broadcast channel information can, for example, include all broadcast channel information provided through digital broadcasting. A user of the first terminal receiving the basic broadcast channel information can perform a pruning operation of manually directly erasing unwanted broadcast channel information.

FIG. 16 is a diagram illustrating a description of broadcast channel information and habit information according to various embodiments of the present disclosure. FIG. 17 is a diagram illustrating a configuration of a response message including broadcast channel information and habit information according to various embodiments of the present disclosure.

Referring to FIGS. 16 and 17, the response message includes, as the broadcast channel information, a channel count indicating the number of channel lists and at least one or more channel lists corresponding to the channel count.

The channel list includes a channel provider ID, a channel provider name, channel information, a channel ID, a channel name, a preferred channel or not, and the like. The response message includes, as the habit information, count habit information indicating the number of habit information lists and at least one or more habit information lists corresponding to the count habit information.

The habit information list includes, as mandatory information, an activity type, an indication whether the content is a VOD, a content provider, a title and the like, and can include, as optional information, a watching channel ID, an on air time start, an on air time end, a watching time, pay or not, prefer or not, search or not, additional information other than channel information, and the like. The mandatory information and the optional information are changed according to need, or any information can be added or removed. Names of the information can be also called any other names in accordance to need or in accordance to role.

According to various embodiments of the present disclosure, a user possessing a first electronic device of various types such as a smart phone, a tablet PC, or the like can receive broadcast channel information of another electronic device possessed by self, from a cloud computing based network server, and share the received broadcast channel information as broadcast channel information of the first electronic device.

According to various embodiments of the present disclosure, a user possessing a first electronic device of various types such as a smart phone, a tablet PC, or the like can receive broadcast channel information of another electronic device located in the same area or an adjacent area of an allowed range, from the cloud computing based network server, and share the received broadcast channel information as broadcast channel information of the first electronic device.

According to various embodiments of the present disclosure, a user possessing a first electronic device of various types such as a smart phone, a tablet PC or the like can receive broadcast channel information of another electronic device having the same broadcast watching habit or a similar broadcast watching habit of an allowed range, from the cloud computing based network server, and share the received broadcast channel information as broadcast channel information of the first electronic device.

Methods according to embodiments stated in claims and/or specification of various embodiments of the present disclosure can be implemented in a form of hardware, software, or a combination of hardware and software. When the methods are implemented by the software, a computer-readable storage medium storing one or more programs (e.g., software modules) can be provided. The one or more programs stored in the computer-readable storage medium are configured to be executed by one or more processors within an electronic device.

The one or more programs can include instructions for enabling the electronic device to execute the methods according to the embodiments stated in the claims and/or specification of the various embodiments of the present disclosure. These programs (e.g., software modules or software) can be stored in a Random Access Memory (RAM), a non-volatile memory including a flash memory, a Read Only Memory (ROM), an Electrically Erasable Programmable ROM (EEPROM), a magnetic disk storage device, a Compact Disk ROM (CD-ROM), a Digital Versatile Disk (DVD) or an optical storage device of other form, and a magnetic cassette.

According to various embodiments of the present disclosure, the programs can be stored in a memory constructed by a combination of some or all of them. In addition, each constructed memory may be included in plural. In addition, the programs can be stored in an attachable storage device accessible to the electronic device through a communication network such as the Internet, an intranet, a Local Area Network (LAN), a Wireless LAN (WLAN) and a Storage Area Network (SAN) or a communication network constructed by a combination of them. This storage device can access the electronic device through an external port. In addition, a separate storage device on the communication network can also access a device performing an embodiment of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An operation method in an electronic device, the method comprising:

creating a request message of requesting to share broadcast channel information, the request message comprising user information and location information;

transmitting the request message to a network server;

receiving a response message corresponding to the request message from the network server; and extracting broadcast channel information comprised in the response message, wherein, if the network server fails in acquiring broadcast channel information based on the user information of the request message, receiving the response message comprises receiving the response message comprising broadcast channel information of another electronic device acquired by the network server based on the location information of the request message.

2. The method of claim 1, wherein the request message further comprises habit information, wherein the user information comprises a user authentication token, wherein the location information comprises one or more of a country code and area identification information, and wherein the habit information comprises a use history of one or more of watching information and preferred channel information.

3. The method of claim 1, wherein the response message comprises broadcast channel information of another electronic device possessed by the same user based on the user information of the request message.

4. The method of claim 1, further comprising receiving the response message comprising broadcast channel information of the another electronic device located in the same area or an adjacent area of an allowed range based on the location information of the request message.

5. The method of claim 2, wherein, if the network server fails in acquiring the broadcast channel information based on the location information, then the network server acquires broadcast channel information of another electronic device having the same habit or similar habit information of an allowed range based on the habit information of the request message.

6. The method of claim 1, wherein the network server manages a channel information database, and wherein the channel information database comprises one or more of user information, location information, and channel set information.

7. The method of claim 6, wherein the user information comprises one or more of a user IDentifier (ID), a user name, and authentication information, wherein the location information comprises one or more of a user ID, a country code, area identification information, and a broadcasting operator ID, and wherein the channel set information comprises one or more of a channel set ID, a provider ID, a provider name, a channel ID, channel information, a channel name, and an indication whether a channel is a preferred channel.

8. The method of claim 6, wherein the channel information database further comprises the habit information, and wherein the habit information comprises one or more of a user ID, an activity type, a Video On Demand (VOD) or not, a provider ID, a channel ID, a title, a genre, a start/end time, an activity time, pay or not, an indication whether a channel is a preferred channel, and a search history.

9. The method of claim 1,
wherein, after being transmitted to the network server, the request message is retransmitted to another electronic device, and
wherein the another electronic device comprises a tuner for digital broadcasting reception.

10. The method of claim 1,
wherein the response message comprises channel list count information and a channel list, and
wherein the channel list comprises one or more of a channel provider ID, a channel provider name, a channel ID, a channel name, and an indication whether a channel is a preferred channel.

11. An electronic device comprising:
a communication module configured to communicate with a network server; and
a processor configured to control the communication module,
wherein the processor is further configured to:
create a request message of requesting to share broadcast channel information, the request message comprising one or more of user information and location information,
transmit the request message to the network server,
receive a response message corresponding to the request message from the network server, and
extract broadcast channel information comprised in the response message,
wherein, if the network server fails in acquiring broadcast channel information based on the user information of the request message, the processor is configured to receive the response message comprising broadcast channel information of another electronic device acquired by the network server based on the location information of the request message.

12. The device of claim 11,
wherein the request message further comprises habit information,
wherein the user information comprises a user authentication token,
wherein the location information comprises one or more of a country code and area identification information, and
wherein the habit information comprises a use history of one or more of watching information and preferred channel information.

13. The device of claim 11, wherein the response message comprises broadcast channel information of another electronic device possessed by the same user based on the user information of the request message.

14. The device of claim 11, wherein the processor is further configured to receive the response message comprising broadcast channel information of the another electronic device located in the same area or an adjacent area of an allowed range based on the location information of the request message.

15. The device of claim 12, wherein, if the network server fails in acquiring the broadcast channel information based on the location information, then the network server acquires broadcast channel information of another electronic device having the same habit or similar habit information of an allowed range based on the habit information of the request message.

16. The device of claim 11,
wherein the network server is configured to manage a channel information database, and
wherein the channel information database comprises one or more of user information, location information, and channel set information.

17. The device of claim 16,
wherein the user information comprises one or more of a user ID (IDentifier), a user name, and authentication information,
wherein the location information comprises one or more of a user ID, a country code, area identification information, and a broadcasting operator ID, and
wherein the channel set information comprises one or more of a channel set ID, a provider ID, a provider name, a channel ID, channel information, a channel name, and an indication whether a channel is a preferred channel.

18. The device of claim 16,
wherein the channel information database further comprises the habit information, and
wherein the habit information comprises one or more of a user ID, an activity type, a Video On Demand (VOD) or not, a provider ID, a channel ID, a title, a genre, a start/end time, an activity time, pay or not, an indication whether a channel is a preferred channel, and a search history.

19. The device of claim 11,
wherein, after being transmitted to the network server, the request message is retransmitted to another electronic device, and
wherein the another electronic device comprises a tuner for digital broadcasting reception, and
wherein the response message comprises channel list count information and a channel list, and the channel list comprises one or more of a channel provider ID, a channel provider name, a channel ID, a channel name, and an indication whether a channel is a preferred channel.

20. A non-transitory computer-readable storage medium storing a program for performing a method claimed in claim 1.

* * * * *